(12) United States Patent
Jesneck et al.

(10) Patent No.: US 8,750,647 B2
(45) Date of Patent: Jun. 10, 2014

(54) KINETIC SUPER-RESOLUTION IMAGING

(75) Inventors: Jonathan Lee Jesneck, Enfield, CT (US); Long N. Phan, Cambridge, MA (US); Sanjay Sarma, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 703 days.

(21) Appl. No.: 13/020,596

(22) Filed: Feb. 3, 2011

(65) Prior Publication Data

US 2012/0201477 A1    Aug. 9, 2012

(51) Int. Cl.
*G06K 9/00*    (2006.01)

(52) U.S. Cl.
USPC ........... 382/299; 382/300; 382/107; 382/294; 382/295

(58) Field of Classification Search
USPC .......................... 382/107, 294–295, 298–300
See application file for complete search history.

(56) References Cited

U.S. PATENT DOCUMENTS

| | | | |
|---|---|---|---|
| 5,912,993 A | 6/1999 | Puetter et al. | 382/275 |
| 6,177,034 B1 | 1/2001 | Ferrone | 264/40.1 |
| 6,285,804 B1 | 9/2001 | Crinon et al. | 382/299 |
| 6,406,437 B1 | 6/2002 | Zur et al. | 600/558 |
| 6,895,125 B2 | 5/2005 | Puetter et al. | 382/265 |
| 7,158,690 B2 | 1/2007 | Gupta | 382/286 |
| 7,218,796 B2 | 5/2007 | Bishop et al. | 382/299 |
| 7,277,565 B2 | 10/2007 | Rasche et al. | 382/128 |
| 7,379,612 B2 | 5/2008 | Milanfar et al. | 382/254 |
| 7,391,931 B2 | 6/2008 | Kameyama et al. | 382/294 |
| 7,420,592 B2 | 9/2008 | Freeman | 348/219.1 |
| 7,449,688 B2 | 11/2008 | Lewis | 250/307 |
| 7,477,802 B2 * | 1/2009 | Milanfar et al. | 382/299 |
| 7,551,771 B2 | 6/2009 | England, III | 382/154 |
| 7,583,860 B2 | 9/2009 | Kuo et al. | 382/300 |
| 7,702,184 B2 | 4/2010 | Aiso | 382/299 |
| 7,729,563 B2 | 6/2010 | Kameyama et al. | 382/299 |
| 2004/0162154 A1 | 8/2004 | DeJohn | 473/266 |
| 2006/0279585 A1 | 12/2006 | Milanfar et al. | 345/694 |
| 2006/0291750 A1 | 12/2006 | Milanfar et al. | 382/299 |
| 2006/0291751 A1 | 12/2006 | Milanfar et al. | 382/299 |
| 2007/0026975 A1 | 2/2007 | Marty et al. | 473/467 |
| 2008/0175452 A1 | 7/2008 | Ye et al. | 382/128 |
| 2009/0010568 A1 | 1/2009 | Nakagami et al. | 382/299 |
| 2009/0060286 A1 | 3/2009 | Wheeler et al. | 382/117 |

(Continued)

OTHER PUBLICATIONS

Korean Intellectual Property Office, Officer Sangcheol Park, International Search Report and Written Opinion, PCT/US2012/020448, date of mailing Aug. 22, 2012, 8 pages.

*Primary Examiner* — Wesley Tucker
(74) *Attorney, Agent, or Firm* — Sunstein Kann Murphy & Timbers LLP

(57) ABSTRACT

Methods and a computer program product for deriving a super-resolution image of a physical object, the super-resolution image characterized by a resolution exceeding a "camera imaging resolution" associated with each of a sequence of lower-resolution images of the physical object. The sequence of images of the physical object is obtained at a plurality of relative displacements with respect to the object. An offset is passively associated with each of the plurality of images to derive effective camera movement, allowing for calculation of a kinetic point spread function on the basis of the effective camera movement. The image sequence is deconvolved, using the kinetic point spread function, to solve for a high-resolution image. Various applications such as portable cameras and infrared imaging for energy conservation are described.

10 Claims, 4 Drawing Sheets

(56) References Cited

U.S. PATENT DOCUMENTS

| | | | |
|---|---|---|---|
| 2009/0060365 A1 | 3/2009 | Nagata et al. | 382/255 |
| 2009/0092337 A1 | 4/2009 | Nagumo | 382/299 |
| 2009/0129704 A1 | 5/2009 | Toda | 382/299 |
| 2009/0153694 A1 | 6/2009 | Takayama | 348/222.1 |
| 2009/0257684 A1 | 10/2009 | Liu | 382/299 |
| 2010/0014709 A1 | 1/2010 | Wheeler et al. | 382/103 |
| 2010/0034477 A1 | 2/2010 | Crisan et al. | 382/244 |
| 2010/0119176 A1 | 5/2010 | Ichihashi et al. | 382/300 |
| 2010/0150474 A1 | 6/2010 | Aiso | 382/284 |
| 2010/0195927 A1 | 8/2010 | Kameyama et al. | 382/260 |

* cited by examiner

KINETIC SUPER-RESOLUTION IMAGING

TECHNICAL FIELD

The present invention relates to novel methods for translating a lower-resolution video sequence into a higher-resolution image or video, and to apparatus effectuating such methods.

BACKGROUND ART

The spatial resolution of an image is fundamentally diffraction-limited by the wavelength of imaging light (or other modality, such as ultrasound or particle beam). In practice, in fact, the resolution of optical systems is poorer yet, and is typically specified in terms of a point spread function (PSF), which represents the impulse response of an imaging system to a point source. In full generality, the PSF is a complex function, i.e., encompassing both the phase and amplitude of the response. The PSF, generally, may vary with the position of the point within the field of view of an imaging system with respect to which the response is being characterized. An image, as obtained by an imaging system, may be represented as the actual source scene convolved with the PSF over the field of view.

Super-resolution (SR) refers to a class of techniques that provide for exceeding the resolution limit imposed by a particular imaging system, or, even by the physical diffraction limit. Super-resolution has extended the information capture abilities of imaging systems. With the increasing availability of cheaper, more computationally powerful processors, super-resolution algorithms are becoming more common. In order to achieve super-resolution, more information must be employed: either constraints on the geometry of the imaged scene, or else a multiplicity of images derived, for example, during the course of relative motion of the imaging system with respect to the imaged scene. Various SR techniques known in the art are described in Chaudhuri (ed.), *Super-Resolution Imaging*, (Springer 2001), and in Bannore, *Iterative-Interpolation Super-Resolution Image Reconstruction* (Springer, 2009), both of which are incorporated herein by reference.

Super-resolution has an inherent limitation, however: for an observed low-resolution image, there are many possible high-resolution images that the camera could have blurred to generate the observed low-resolution image. Super-resolution is an ill-posed inverse problem, a class of computationally challenging inference problems. All existing SR techniques that reconstruct a SR image from multiple images, derived, for example, in the course of motion, do so by performing a "blind" deconvolution, which is to say that the PSF is modeled at the same time that the image is being sharpened. Blind deconvolution concurrently approximates both the unknown high-resolution image and the blurring process, and is described, for example, in Takeda et al., "Removing Motion Blur with Space-Time Processing," *IEEE Trans. Image Proc.* (in press, 2010, available at http://users.soe.ucsc.edu/~milanfar/publications/journal/MotionDeblurringRevised.pdf), which is incorporated herein by reference.

Although existing super-resolution algorithms can perform well in laboratory conditions with very well described blurring conditions, real-world applications of super-resolution have lagged because of the complexity of real blurring and degradation conditions. Since the "inverse problem" is ill-posed and its solution is notoriously an unstable, iterative process, an efficient and stable technique for obtaining a super-resolved image from motion data is, thus, highly desirable.

Other super-resolution algorithms, such as the Pixon method, widely used in infrared astronomy and described in U.S. Pat. No. 5,912,993, require expansion of multi-resolution data in terms of a set of generalized image cells.

Several registration systems have been built that use motion data to achieve super-resolution imaging, however all of the prior art systems use external measures of camera position, such as accelerometers and tilt meters. These external measures suffer from drift problems, in which small errors are compounded with more camera motion. Indeed, the external measures of camera position are rarely as precise as a pixel size in high-resolution cameras. Therefore it would be desirable for there to be an efficient, stable and robust technique for performing image registration directly from the images themselves.

SUMMARY OF EMBODIMENTS OF THE INVENTION

Accordingly, embodiments of the present invention teach a novel motion-based characterization of an imaging system, allowing for the direct application of novel motion-based super-resolution methods that can be coupled with traditional spatial- or frequency-domain super-resolution methods for increased camera performance.

In accordance with preferred embodiments of the present invention, a method is provided for deriving a super-resolution image of a physical object, wherein the super-resolution image is characterized by a resolution exceeding a specified "camera imaging resolution." The method has steps of:

a. receiving a sequence of images of the physical object at a plurality of displacements wherein each of the plurality of images is characterized by the "camera imaging resolution;"

b. passively associating an offset with each of the plurality of images to derive effective camera movement;

c. calculating a kinetic point spread function on the basis of the effective camera movement; and d. deconvolving the image sequence to solve for a high-resolution image on the basis of the calculated kinetic point spread function.

In accordance with other embodiments of the invention, the method may have an addition step of imaging the physical object at a plurality of displacements to derive the sequence of images, wherein each of a plurality of images is characterized by the camera imaging resolution. In yet other embodiments, passively associating an offset with each of the plurality of images may include associating an offset relative to a reference image, which, in turn, may (but need not) be derived using a high-resolution imaging modality distinct from an imaging modality used to obtain the image sequence. Passively associating an offset with each of the plurality of images may also include minimizing a loss function or determining a minimum gradient of an error surface.

In further embodiments of the present invention, the step of deconvolving may includes regularization, and, more particularly, Tikhonov regularization. Imaging may be performed in the infrared. Additionally, there may be a step of registering and superposing multiple preliminary images in order to constitute one or more of the plurality of images derived in imaging a physical object.

In accordance with alternate embodiments of the present invention, a computer program product is provided for use on a computer system for deriving a super-resolution image of a physical object. The computer program product has a computer usable medium with computer readable program code thereon, and the computer readable program code includes:

memory for storing a sequence of images of the physical object at a plurality of displacements wherein each of the plurality of images is characterized by the camera imaging resolution;

a module for passively associating an offset with each of the plurality of images to derive effective camera movement;

computer code for calculating a kinetic point spread function on the basis of the effective camera movement; and a software module for deconvolving the image sequence to solve for a high-resolution image on the basis of the calculated kinetic point spread function.

BRIEF DESCRIPTION OF THE DRAWINGS

The present patent or application file contains at least one drawing executed in color. Copies of this patent with color drawing(s) will be provided by the Patent and Trademark Office upon request and payment of necessary fee.

The foregoing features of the invention will be more readily understood from the following detailed description, considered with reference to the accompanying drawings, in which:

FIG. 2(a) plots camera motion as derived by passive image registration taught below; FIG. 2(b) depicts a kinetic point spread function (PSF) based on camera motion; FIG. 2(c) is a heatmap of an error surface for registering the positions of two images, and FIG. 2(d) is a three-dimensional view of the error surface in FIG. 2(c). Note the semi-planar grid caused by sub-pixel linear interpolation during image registration.

FIG. 3(a) is an original video frame; FIG. 3(b) is an original video frame image with bi-cubic interpolation; FIG. 3(c) is a kinetic super-resolution (KSR) image from a still camera video; and FIG. 3(d) is a KSR image from a camera motion video, all in accordance with embodiments of the present invention.

DETAILED DESCRIPTION OF SPECIFIC EMBODIMENTS

Definitions

Figure 1:
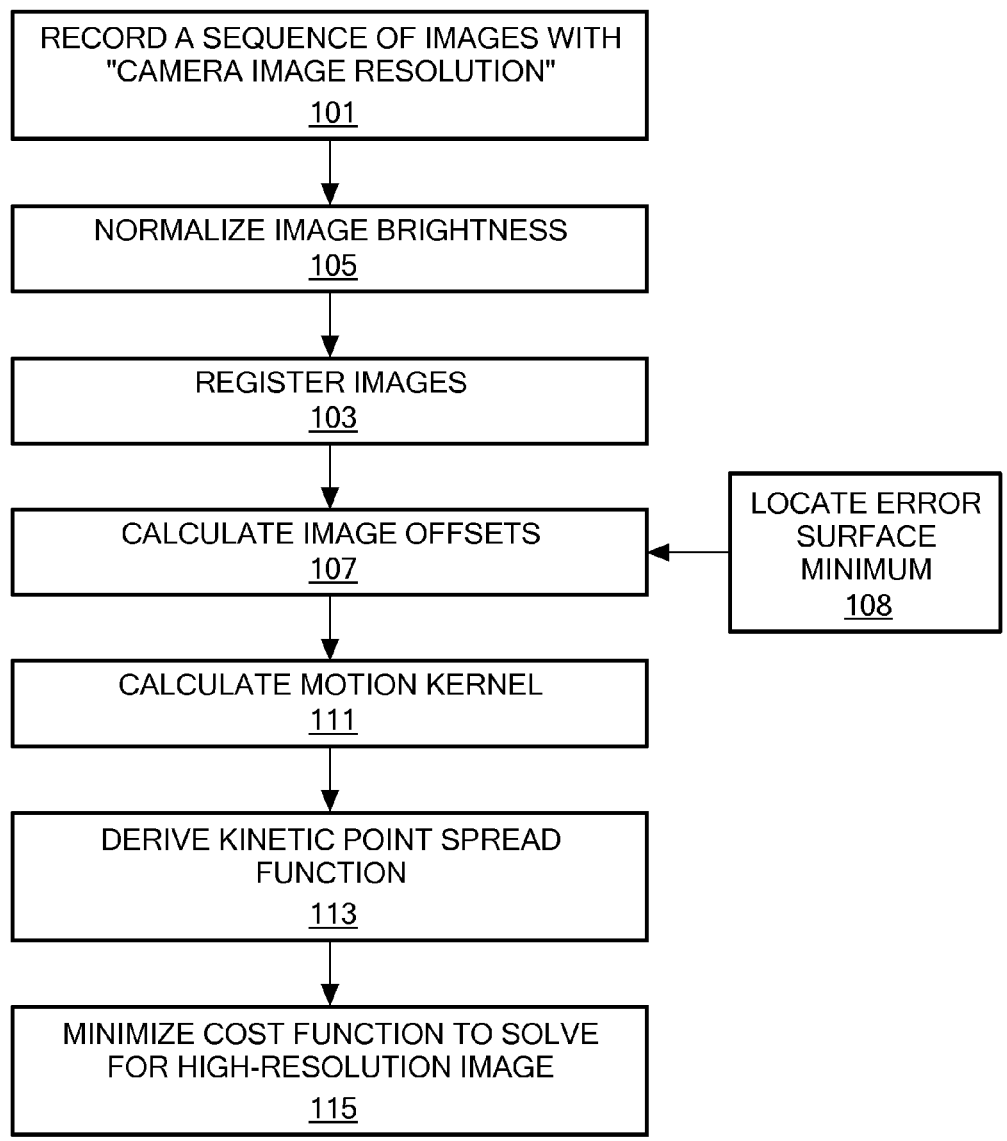
FIG. 1 is a flowchart depicting steps in practice of an embodiment of the present invention.
Figure 2A:
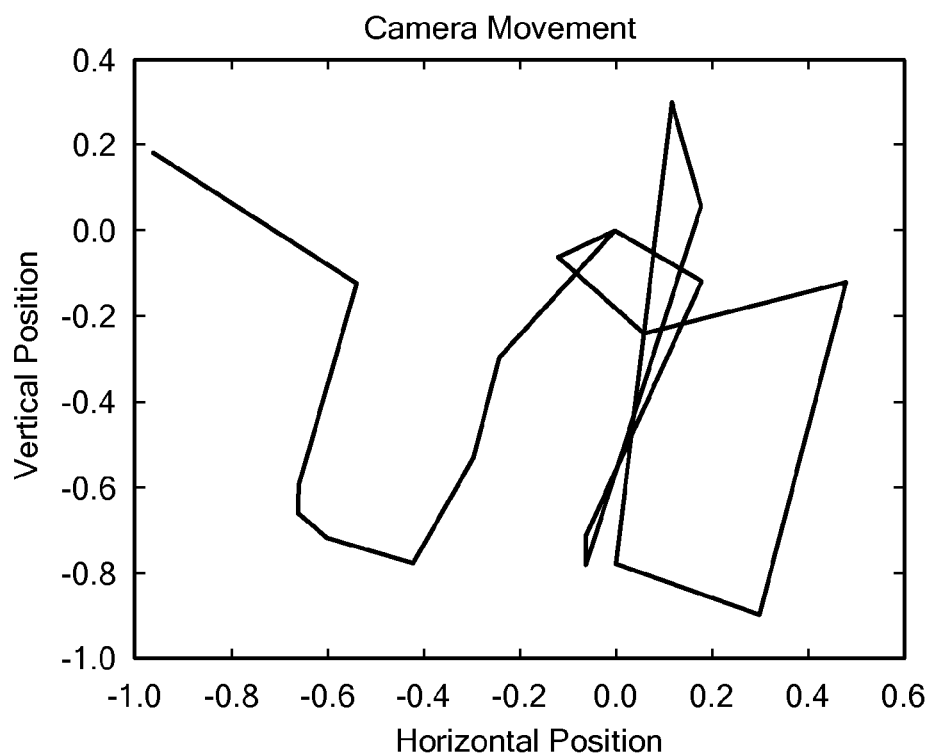
FIGS. 2(a)-(d) characterize the relative motion of a camera and a physical object, in accordance with embodiments of the present invention.
Figure 2B:
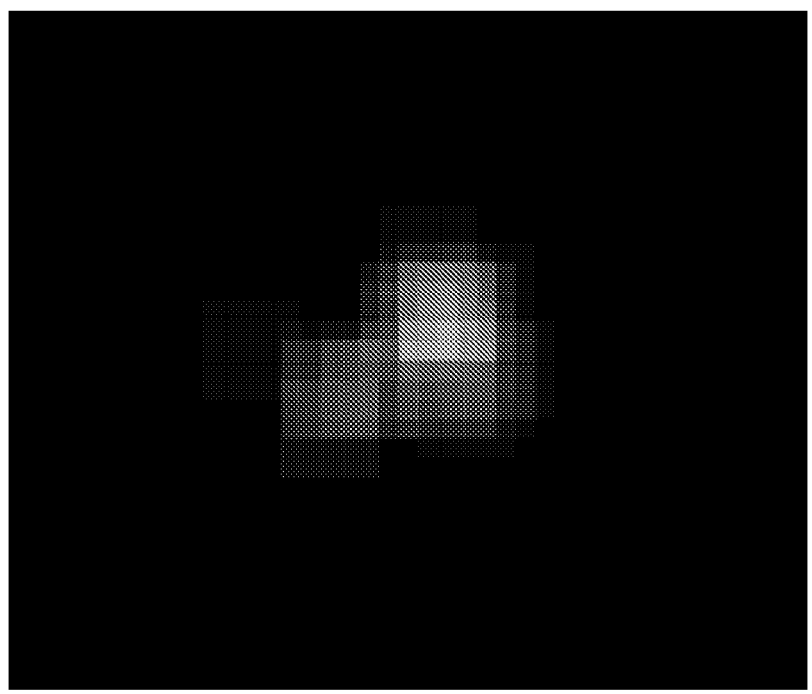
Figure 2C:
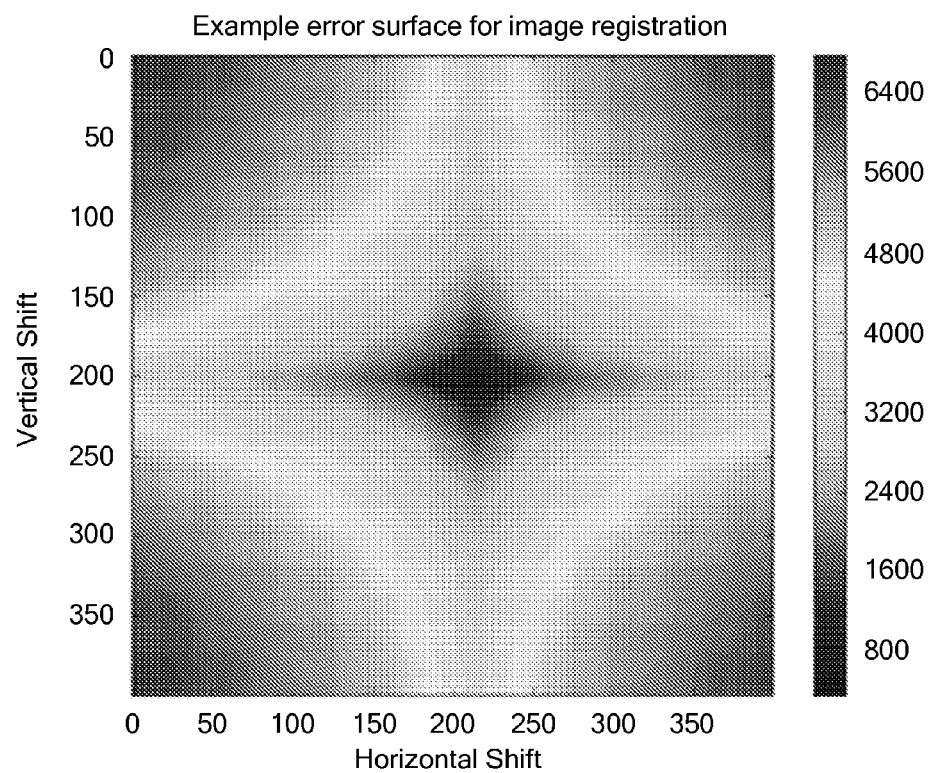
Figure 2D:
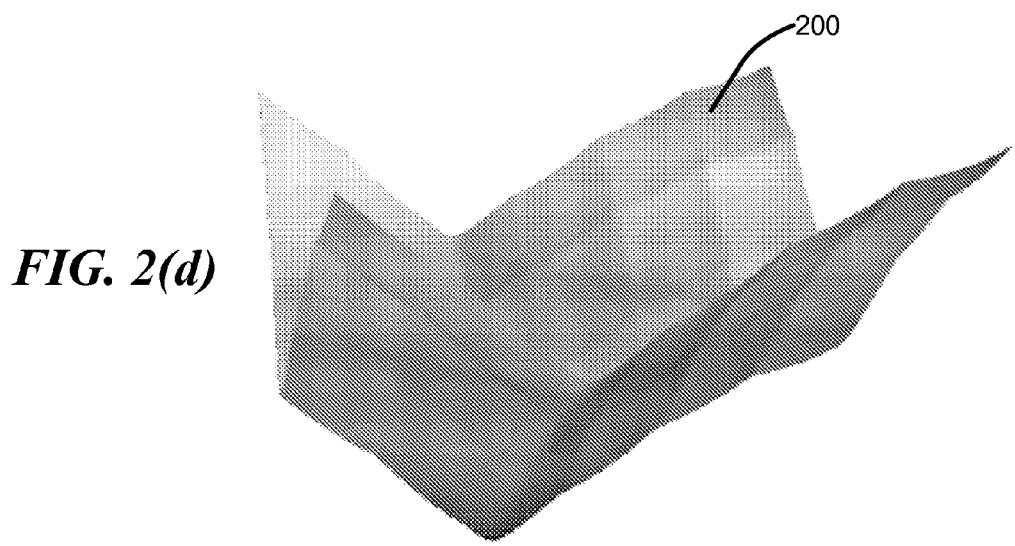
Figure 3A:
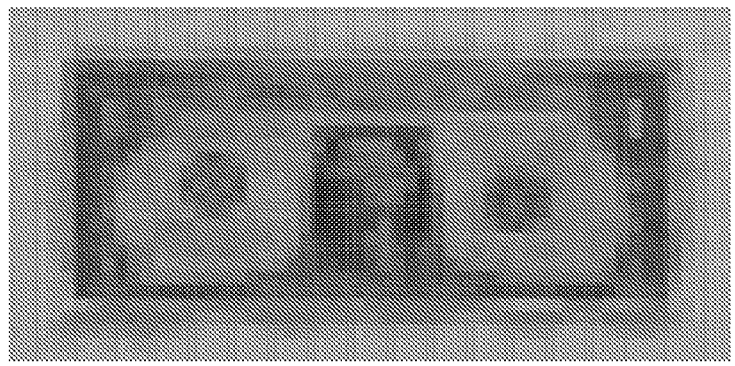
FIGS. 3(a)-(d) illustrate the resolution benefit of camera motion, where
Figure 3B:
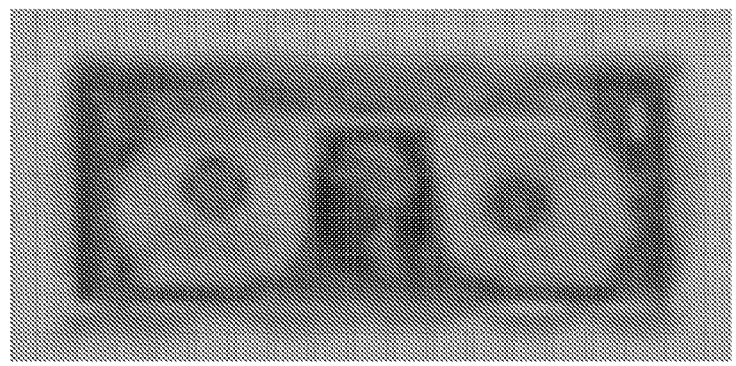
Figure 3C:
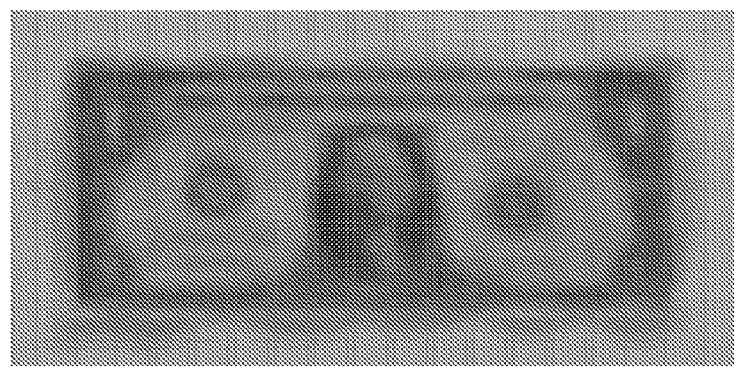
Figure 3D:
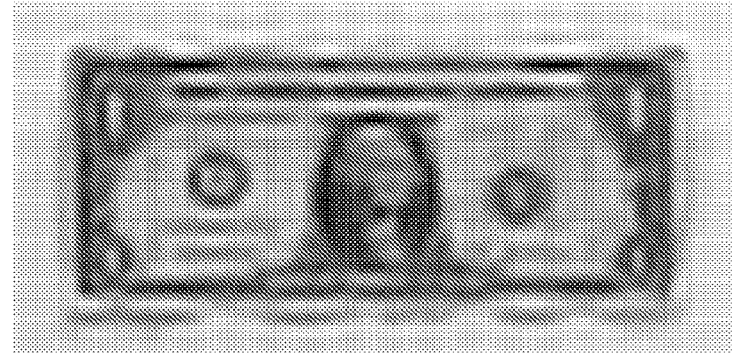

As used in this description and the accompanying claims, the following term shall have the meanings indicated, unless the context otherwise requires:

The term "image" shall refer to any multidimensional representation, whether in tangible or otherwise perceptible form, or otherwise, whereby a value of some characteristic (such as brightness) is associated with each of a plurality of locations corresponding to dimensional coordinates of an object in physical space, though not necessarily mapped one-to-one thereonto. Thus, for example, the graphic display of the spatial distribution of some field, either scalar or vectorial, such as brightness or color, constitutes an image. So, also, does an array of numbers in a computer memory or holographic medium. Similarly, "imaging" refers to the rendering of a stated physical characteristic in terms of one or more images.

The term "object" shall refer to a tangible, non-transient, physical object capable of being rendered as an image.

The terms "displacement" and "offset" shall not be limited to a translational offset but shall include rotation as well, such that any solid body motion may be referred to herein, and in any appended claims, as a "displacement."

The term "camera imaging resolution" shall refer to one or more imaging resolutions, typically lower than the final resolution of the process described herein, which characterize the sequence of images serving as input to methods in accordance with the present invention, whether or not the images are obtained by an actual "camera" or using another modality, including ultrasound, etc.

The term "passive," where applied to the registration of video frames, shall denote registration on the basis of image analysis rather than on the basis of deterministically moving a camera.

A "kinetic point spread function" is a point spread function derived on the basis of relative motion of an object and a camera imaging the object, however the relative motion itself may be derived.

In accordance with embodiments of the present invention, multiple images (each of which may be referred to, herein, as a "frame"), typically obtained from a camera (or other imaging modality, such as ultrasound, radar, or atomic force microscopy) are modeled, as is customary in SR processing, as a degradation of an unknown high-resolution image. A series $Y(k)$ of $k=1, 2, \ldots K$ low-resolution camera images may be represented as $$Y(k)=D(k)H(k)F(k)X+V(k), k=1,2,\ldots,K$$

where $D(k)$ is a down-sampling operator (which may also be referred to, herein, as a "decimation operator"), $H(k)$ is a blurring kernel, $F(k)$ encodes the motion information of the kth frame, X is the unknown high-resolution image, and $V(k)$ is additive noise. A high-resolution scale is associated with X, which is down-sampled to match the low-resolution scale associated with the series of low-resolution images. The super-resolution task is then to estimate the unknown high-resolution image X such that a blurred version of the estimate obtained maximally agrees with noisy observed images $Y(k)$. In other words, the task is to minimize $$\hat{X} = \operatorname*{argmin}_{X} \sum_{k=1}^{K} \|DF(k)HX - Y\|_1^1.$$

In traditional solutions, the motion information in F is typically either ignored or incompletely utilized. Those studies that have focused on the imaging system's motion component have demonstrated the benefit of modeling the camera motion. Notably, Ben-Ezra et al., "Jitter Camera: A Super-Resolution Video Camera," *SPIE Visual Communications and Image Processing* 2006 Proceedings, vol. 6077 paper 60774 (2006), which is incorporated herein by reference, teaches a "jitter camera" that has an actuator-driven mirror with a precisely-controlled motion pattern. In accordance with the teachings provided herein, camera motion is neither deterministically driven, nor is it merely a nuisance to be corrected, but is a fundamental component of an imaging system.

A novel method, in accordance with preferred embodiments of the present invention, is now described with reference to the flowchart of FIG. 1. A video sequence is recorded (as designated by numeral 101) using a digital camera, such as a Microsoft web camera, or any other camera capable of electronically capturing a stream of images. (Indeed, any other imaging modality, including ultrasound, or imaging using charged particles, for example, are within the scope of the present invention.) Motion of an object to be imaged, also referred to herein as an "imaging target," relative to a focal plane of the camera is provided, either by moving the camera or by moving the imaging target. In one exemplary application of the present invention, the camera was held by hand and small motions were introduced through small hand movements, while, in another exemplary application of the present invention, the camera was set on a stable surface. In the example, the camera recorded 30 frames per second at 24-bit color depth and at 320×240 pixel resolution. The imaging target, for purposes of the example, was a US $1 bill taped to a whiteboard, approximately 3 meters from the camera.

Passive Registration of Video Frames

Multi-frame super-resolution is highly dependent on accurate and precise image registration. In accordance with the present invention, a simple spatial-domain method for sub-pixel image registration is introduced. This registration method is passive; instead of requiring external measures of camera position or active positioning markers, the method uses only a sequence of images.

Image registration (103) may be performed using various strategies, within the scope of the present invention, as claimed in any appended claims. Two such strategies include feature identification and tracking, and spatial similarity metrics. Feature identification is typically difficult and computationally complex, and is, therefore, not a preferred method for implementing the present invention. In accordance with preferred embodiments of the present invention, image registration 103 is performed on the basis of spatial similarity, which may be advantageously simpler and faster. Considering horizontal and vertical translation as well as rotation (i.e., assuming, solely for purposes of heuristic simplicity, constancy of the focal plane relative to the imaging target, although the claimed invention is not so limited), the total camera motion F is represented as product of translational and rotational motion operators $$F = S_x^l S_y^m R,$$

where $S_x^l$ and $S_y^m$ are the operators corresponding to shifted the image by l pixels in the horizontal direction and m pixels in the vertical direction, and R is the rotation matrix $$R = \begin{vmatrix} \cos(\theta) & -\sin(\theta) \\ \sin(\theta) & \cos(\theta) \end{vmatrix}$$

defined by a rotational angle θ. It is to be understood that F(k) may also include a focus factor accounting for camera motion along a line-of-sight to the imaged object, within the scope of the present invention. Most generally, F(k) accounts for orientation, scaling and tilting of respective images relative to a reference image.

The image brightness of successive images is normalized (105) to account for periodic camera recalibration of exposure settings while filming. Image brightness normalization may be performed, for example, by subtracting each video frame's mean pixel value from the image: Y'=Y−Ȳ, where Y is the original observed image and Ȳ is its mean pixel value. With normalized images, the difference between a pair of video frames is substantially limited to positional movement. Thus, image offset between a reference image and a test image may be calculated 107 by defining a loss function L, where $$L(x,y,\theta; Y_0, Y_k) = |Y_0(x,y,\theta) - Y_k(x-x_k, y-y_k, \theta-\theta_k)|$$

and the optimal solution is defined by $$(l', m', \theta') = \underset{x,y,\theta}{\operatorname{argmin}} \|Y_0 - FY\|_1$$

where $x_k$, $y_k$, and $\theta_k$ are respectively the row, column, and angle offsets for image $Y_k$ compared to reference image $Y_0$.

Loss function L can be used to describe an error surface 200, quantifying the difference among images as a function of their respective offsets, as shown in FIG. 2. Error surface 200 can be filled in, between the pixel-scale grid points, by subpixel interpolation of image I. If the "video" (i.e., the image sequence) was obtained with sufficient light for an adequate signal strength, error surface 200 is well defined. For high signal-to-noise ratio conditions, the error surface minimum may be located (108) (shown in FIG. 1) with gradient descent techniques. In low-light and low signal-to-noise conditions, the minimum may be located by employing stochastic sampling, such as a genetic algorithm. FIG. 2 shows an example error surface for horizontal and vertical translational movement.

Minimizing the loss function is but one method for obtaining a reference image $Y_0$ with respect to which offsets may be defined. In accordance with other embodiments of the invention, there may be a high-resolution image, possibly obtained using a distinct imaging modality, that may be used as a reference image. In that case, offsets ($x_k$, $y_k$, $\theta_k$) are determined by matching the location of each low-resolution image to a corresponding location in the high-resolution image, which entails determining the phase shift of each low-resolution image inside the high-resolution image.

Resolution Improvement Through Image Aggregation

For heuristic convenience, it is assumed that the image sequence comes from the one camera, so that the decimation operator D(k)=D and blurring kernel H(k)=H do not change across the image sequence, although that assumption is not necessary for practice of the methods of the present invention as claimed. A gradient that defines the steepness of the error surface during image registration may be represented as $$G = \sum_{k=1}^{K} F^T(k) D^T \operatorname{sign}(DF(k)HX - Y(k)).$$

Images of the image sequence may be registered 103 by a gradient descent method such that either G=0 or the solver finds the minimum gradient subject to the boundary conditions of the search space of (x, y, θ). Image registration 103 may also be achieved by other means, within the scope of the present invention. The gradient descent approach, when employed, defines the relative positions of all images in an image sequence, which defines the camera movement.

Minimization of the loss function to yield ($x_k$, $y_k$, $\theta_k$) for each image $Y_k$ of the image sequence provides an accurate representation of camera movement F(k), which, in accordance with the present invention, may be used for extracting sub-pixel resolution information, as now described.

Deconvolution with a Motion-Based Blurring Kernel

Considering the camera movement F(k) an intrinsic quality of the imaging system, a kernel description of the motion may be defined (111) for deconvolution to improve image resolution. A two-dimensional impulse function is defined that is a matrix with all zeros except for a single one in the center.

$$I = diag[0, \ldots, 0, 1, 0, \ldots, 0],$$

where I is defined in the low-resolution scale. In the high-resolution scale, I is a single block of ones:

$$I = \begin{bmatrix} 0 & & & & & & & 0 \\ & \ddots & & & & & \iddots & \\ & & 0 & 0 & 0 & 0 & 0 & \\ & & 0 & 1 & 1 & 1 & 0 & \\ & & 0 & 1 & 1 & 1 & 0 & \\ & & 0 & 1 & 1 & 1 & 0 & \\ & & 0 & 0 & 0 & 0 & 0 & \\ & \iddots & & & & & \ddots & \\ 0 & & & & & & & 0 \end{bmatrix}.$$

This motion-based kernel may be easily combined with the traditional optical-blur kernel by replacing the block of ones with the blurring matrix, such as a 2D Gaussian kernel.

In the foregoing example, a 3*3=9× resolution increase has been depicted from the low-resolution camera image resolution to the high-resolution scale. The motion-based point spread function may then be obtained by integration of that impulse function across the camera movements:

$$PSF = \sum_{k=1}^{K} F(k)I.$$

The foregoing point spread function may be referred to as a "kinetic point spread function" or a "kinetic PSF." The kinetic PSF, derived (113) in the foregoing manner, may be advantageously employed to remove the blurring effect of the kernel by applying standard deconvolution techniques, using regularization such as Tikhonov regularization. Accordingly, the cost function $$C = \sum_{k=1}^{K} \|DF(k)HX - Y\|_1^1 + \alpha \lambda(x)$$

is minimized, where $\lambda(x) = \|Qx\|_2^2$ is a penalty term in which the matrix Q represents a high-pass filter so that the regularization represents a general smoothness constraint. Minimizing C (115) provides the sought-after high-resolution image, X. FIG. 3 shows an example video frame images (FIGS. 3(a)-(c)) and the video sequence's kinetic super-resolution image (FIG. 3(d)).

By virtue of the image-based registration taught, above, in accordance with the present invention, additional registration flexibility is advantageously afforded. For example, the images can be registered to a coordinate system based on moving object, rather than on the absolute camera position.

In accordance with alternate embodiments of the present invention, the foregoing methods for improving the resolution of an image based on motion may be employed advantageously for enhanced digital zoom and mobile phone cameras.

Energy Efficiency and Infrared Imaging

Imaging at longer wavelengths is subject to constraints of lower resolution (and, typically, poorer sensitivity) than imaging at shorter wavelengths. In particular, infrared cameras have poorer resolution and field-of-view than counterparts in the visible portion of the spectrum. This is particularly the case in the "thermal" portion of the infrared spectrum, at wavelengths longward of 5 µm. Consequently, methods in accordance with the teachings herein may be used to great advantage in visualizing the temperature of scenes such as housing for purposes of detecting instances of heat loss and of improving energy efficiency. High-resolution infrared images are created by combining a series of low-resolution images, obtained with an infrared camera, and positioning them relative to a high-resolution image obtained in the visible portion of the spectrum.

In accordance with alternate embodiments of the present invention, a high-throughput remote sensing system is provided for identifying energy efficiency opportunities by targeting buildings with potential for significant return on investment in structural improvements.

Intelligence

Super-resolution imaging, in accordance with the teachings of the present invention, may advantageously allow larger areas to be surveyed for potential threats or to gather intelligence with much cheaper and lighter equipment. The higher resolution allows superior target identification, and the lighter weight benefits various applications such as aerial surveillance.

Medical Imaging

Many medical imaging modalities, such as ultrasound imaging and microscopy, have small fields of view and widely discrepant resolution. These modalities may be combined with larger-scale imaging to produce super-resolution images in accordance with the teachings of the present invention.

Astronomy

Astronomical imaging systems must deal with a tradeoff between field of view and light sensitivity; the more sky that is imaged in one shot, the worse the detail and the fainter the light signal on each part of the detector. Super-resolution techniques in accordance with embodiments of the present invention may advantageously provide for a small field-of-view telescope to take a series of low-resolution images with higher light sensitivity, and then combine those images into one large high-resolution image.

Multi-Frame Image Enhancement

The foregoing teachings that provide for overlay and aggregation of images in order to achieve super-resolution may also be employed for purposes of improving signal to noise under conditions of low light. In accordance with alternate embodiments of the present invention, a preliminary step of image contrast enhancement is performed using histogram equalization to rescale pixel values to a range that shows more detail, such that $$p_x(i) = \frac{n_i}{n}, 0 \le i < L$$

where $p_x(i)$ is the probability of an occurrence of pixel value I of a discrete image [x], $n_i$ is the number of pixels with value i, n is the total number of pixels in the image, and L is the total number of pixel levels in the image. The range of observed pixel values is then mapped onto a wider range according to $$y' = y(\max(|x|) - \min(|x|)) + \min(|x|),$$

where $y = cdf_x(x)$ is the cumulative distribution function of the probability distribution of the pixel values.

By modeling the shot-noise component in a sequence of frames, stable image features are identified stochastically that serve to register the images relative to one another. The images are then registered with a stochastic search over the error surface defined by the difference between a particular image and a reference image with a give offset:

$$E(x_k, y_k) = \sum_{x,y} \|I_0(x, y) - I(x - x_k, y - y_k)\|$$

where $x_k$, $y_k$, and $\theta_k$ are, respectively, the row, column and angular offsets for image $Y_k$ relative to reference image $Y_0$.

Once the registration offsets of the video frames have been determined, each pixel value is averaged over stack of collocated pixels, reducing the noise per pixel by $\sim\sqrt{N}$, where N is the number of stacked images, while avoiding motion blur, as the expected value of each value converges to the mean, while the variance is inversely proportional to N.

Once the superposition image has been obtained, kinetic super-resolution algorithm described in detail above may be applied.

Improvements in signal strength and resolution of very low-light images may be applied advantageously in various applications, of which the following are provided as examples, without limitation:

Low-Cost Portable Cameras

Cell phone cameras notoriously produce low-quality images under low-light conditions. Space and cost considerations preclude large lenses and detections. Additionally, long exposure times are precluded since the cameras are hand-held. Therefore, methods in accordance with the present invention are advantageously applied in the context of cell phones and other hand-held cameras.

Night-Time Surveillance Systems for High-Speed Targets

Higher quality scans of moving vehicles and people, taken under either day or night illumination conditions, are enabled by application of methods described herein.

Night Vision Systems, Generally

Portable, hand-held and helmet-mounted night vision systems can greatly increase night-time visibility by application a video version of the methods described herein, allowing for better object tracking a automated identification of personnel.

Passive Low-Signal Imaging Systems

For many surveillance applications, the use of illuminators is precluded by concerns of covertness, such that imaging is limited to the use of ambient light. Improvements in signal-to-noise provided in accordance with teachings of the present invention are of particular advantage in such contexts.

The embodiments of the invention described herein are intended to be merely exemplary; numerous variations and modifications will be apparent to those skilled in the art. For example, other deconvolution algorithms are within the scope of the present invention, such as deconvolution algorithms weighted in accordance with local variance information, yielding standard deviation (STD) images, which are described in Rank et al., "Estimation of Image Noise Variance," *IEEE Proc. Vis. Image Signal Process.*, vol. 146, pp. 80-84 (1999), which is incorporated herein by reference. Additionally, the process may be repeated in time, such that the resultant high-resolution image is itself one of a sequence of images that, together, constitute a video. All such variations and modifications are intended to be within the scope of the present invention as defined in any appended claims.

In preferred embodiments of the present invention, the disclosed methods for increasing image signal-to-noise or resolution are implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

What is claimed is:

1. A method for deriving a super-resolution image of a physical object, the super-resolution image characterized by a resolution exceeding a "camera imaging resolution," the method comprising:
   a. receiving a sequence of images of the physical object at a plurality of displacements wherein each of the plurality of images is characterized by the camera imaging resolution;
   b. passively associating an offset with each of the plurality of images to derive effective camera movement, wherein passively associating an offset with each of the plurality of images includes associating an offset relative to a reference image;
   c. calculating a kinetic point spread function on the basis of the effective camera movement; and
   d. deconvolving the image sequence to solve for a high-resolution image on the basis of the calculated kinetic point spread function.

2. A method in accordance with claim 1, further comprising imaging the physical object at a plurality of displacements to derive the sequence of images wherein each of a plurality of images is characterized by the camera imaging resolution.

3. A method in accordance with claim 1, wherein the reference image is derived using a high-resolution imaging modality distinct from an imaging modality used to obtain the image sequence.

4. A method in accordance with claim 1, wherein passively associating an offset with each of the plurality of images includes minimizing a loss function.

5. A method in accordance with claim 1, wherein passively associating an offset with each of the plurality of images includes determining a minimum gradient of an error surface.

6. A method in accordance with claim 1, wherein the step of deconvolving includes regularization.

7. A method in accordance with claim 6, wherein the regularization employed in the step of deconvolving includes Tikhonov regularization.

8. A method in accordance with claim 2, wherein the step of imaging includes imaging in the infrared.

9. A method in accordance with claim 1, further comprising registering and superposing multiple preliminary images in order to constitute one or more of the plurality of images derived in imaging a physical object.

10. A computer program product for use on a computer system for deriving a super-resolution image of a physical object, the super-resolution image characterized by a resolution exceeding a "camera imaging resolution," the computer program product comprising a non-transitory computer usable medium having computer readable program code thereon, the computer readable program code including:

memory for storing a sequence of images of the physical object at a plurality of displacements wherein each of the plurality of images is characterized by the camera imaging resolution;

a module for passively associating an offset with each of the plurality of images to derive effective camera movement, wherein passively associating an offset with each of the plurality of images includes associating an offset relative to a reference image;

computer code for calculating a kinetic point spread function on the basis of the effective camera movement; and a software module for deconvolving the image sequence to solve for a high-resolution image on the basis of the calculated kinetic point spread function.

\* \* \* \* \*